(12) United States Patent
Bicego et al.

(10) Patent No.: US 11,420,577 B2
(45) Date of Patent: Aug. 23, 2022

(54) RADAR TRANSPARENT DECORATIVE PLATE FOR THE FRONT GRILLE OF A MOTOR VEHICLE

(71) Applicant: PRIMA SOLE COMPONENTS S.P.A., Torrice (IT)

(72) Inventors: Andrea Bicego, Oderzo (IT); Alessandro Costa, Oderzo (IT); Marco Piazzon, Oderzo (IT)

(*) Notice: Subject to any disclaimer, the term of this patent is extended or adjusted under 35 U.S.C. 154(b) by 247 days.

(21) Appl. No.: 16/958,958

(22) PCT Filed: Dec. 28, 2017

(86) PCT No.: PCT/IB2017/001597
§ 371 (c)(1),
(2) Date: Jun. 29, 2020

(87) PCT Pub. No.: WO2019/130033
PCT Pub. Date: Jul. 4, 2019

(65) Prior Publication Data
US 2020/0339053 A1     Oct. 29, 2020

(51) Int. Cl.
*B60R 19/52* (2006.01)
*B60R 13/00* (2006.01)
*H01Q 1/42* (2006.01)

(52) U.S. Cl.
CPC ............ *B60R 19/52* (2013.01); *B60R 13/005* (2013.01); *H01Q 1/42* (2013.01); *B60R 2019/525* (2013.01)

(58) Field of Classification Search
CPC ......... B60P 1/28; B60R 13/005; B60R 21/34; B62D 21/155
(Continued)

(56) References Cited

U.S. PATENT DOCUMENTS 6,328,358 B1    12/2001   Berweiler
8,287,990 B2    10/2012   Maeda et al.
(Continued)

FOREIGN PATENT DOCUMENTS

EP    1812989 A1    8/2007
EP    3018505 A1    5/2016
(Continued)

OTHER PUBLICATIONS

International Search Report for corresponding PCT/IB2017/001597.
Written Opinion of the ISA for corresponding PCT/IB2017/001597.

*Primary Examiner* — D Glenn Dayoan
*Assistant Examiner* — Sunsurraye Westbrook
(74) *Attorney, Agent, or Firm* — Egbert, McDaniel & Swartz, PLLC

(57) ABSTRACT

Radar transparent decorative plate for the front grille of a motor vehicle, of the monobloc type with a first layer of PMMA transparent to light, like a smooth lens with decorative elements in relief on the back, and an overmoulded second layer of opaque ABS-PC or opaque ABS that compensates for the height thereof simultaneously realizing a support with integrated fastening elements and a masking background. On the back is a particular decorative treatment having an ultra-thin metallization layer with a thickness of less than 0.05 micrometres, on which a shadowing layer with an anti-transparency effect is superimposed. Embodiment variants are provided in which the decorative elements have a three-dimensional appearance obtained from a mould by means of cavities in the head or with a shading optical effect.

13 Claims, 6 Drawing Sheets

(58) Field of Classification Search
USPC .... 293/115, 193.1, 102, 117, 120, 133, 155; 296/18.09, 193.09, 203.02
See application file for complete search history.

(56) References Cited

U.S. PATENT DOCUMENTS

| | | | |
|---|---|---|---|
| 10,836,442 B1* | 11/2020 | Grattan | B62D 25/2072 |
| 2007/0176441 A1* | 8/2007 | Lau | B60R 19/52 |
| | | | 293/115 |
| 2008/0079271 A1* | 4/2008 | Maruko | B60R 19/52 |
| | | | 293/102 |
| 2011/0273356 A1 | 11/2011 | Kawaguchi et al. | |
| 2014/0093665 A1 | 4/2014 | Horibe et al. | |
| 2014/0218263 A1 | 8/2014 | Burdenski et al. | |
| 2015/0076851 A1 | 3/2015 | Sugiura et al. | |
| 2015/0086731 A1 | 3/2015 | Sugiura et al. | |
| 2015/0136512 A1* | 5/2015 | Tashiro | B60R 19/12 |
| | | | 293/109 |
| 2017/0301982 A1 | 10/2017 | Ohtake et al. | |
| 2017/0352938 A1 | 12/2017 | Okumura et al. | |
| 2019/0061678 A1* | 2/2019 | Shen | B60R 19/12 |

FOREIGN PATENT DOCUMENTS

| | | |
|---|---|---|
| IT | TV20120152 A1 | 2/2014 |
| JP | 2002135030 A | 5/2002 |
| JP | 2010274754 A | 12/2010 |

* cited by examiner

RADAR TRANSPARENT DECORATIVE PLATE FOR THE FRONT GRILLE OF A MOTOR VEHICLE

The present invention relates to a decorative plate transparent to the emission waves of a radar system for the front grille of a motor vehicle.

FIELD OF THE INVENTION

The invention finds particular although not exclusive application in the industrial sector of the production and marketing of components for motor vehicles; in particular an advantageous decorative plate is proposed, of the manufacturer's badge type, intended to close the opening made in a front grille of a motor vehicle in correspondence of radar system that is placed inside it and is facing the direction of travel.

Front grilles, which are also called radiator grilles, are widely known and used in motor vehicles and are placed in front of the cooling system in such a way as to protect it and facilitate the heat exchange with air during the travel. It is also known that such grilles strongly characterize the front design of the vehicle, providing a manufacturer with identity and recognizability; to this purpose, they often contain the embellishing and/or characterising elements, such as chromed fillets, frames and the brand's distinctive badges. Generally, a modern radiator grille consists of a main body of plastic material shaped in such a way as to couple with a relative opening present on the front of the body or of the bumper; the distinctive badge, in its turn, is generally integrated in said grille in a central position, clearly visible, being joined to it in a housing seat by means of snap-in or mechanical fastening elements, or by means of an adhesive layer.

Said distinctive badge is generally a multi-layer element shaped as a thin circular or oval plate, mainly consisting of a base layer of plastic or metal on which the single contrasting decorative layers are superimposed by following applications, also providing maskings and/or selective coatings and/or metallization treatments; sometimes, due to production convenience or to obtain a particular aesthetic effect, one uses the technology of multi-injection of different materials or the technology of hot transfer of previously inked and/or metallized parts on supporting films, or even the technology of shaping and/or overmoulding of a film pre-decorated with the whole image of the badge. Often, said decorated plate is conceived in such a way that the most external layer is of a transparent and protective material, having a large radius of curvature like a lens. Furthermore, in modern badges for front grilles, single decorative elements are also provided, which protrude three-dimensionally, such as the manufacturer's logo and/or the frame that surrounds it perimetrically, being sometimes of considerable sizes for the purpose of the recognizability of the brand.

It is also known that, nowadays, more and more motor vehicles are equipped with new electronic devices aimed at increasing driving safety like, for example, the detection systems based on the emission of electromagnetic waves; particularly, one should think of the systems for the automatic adjustment of the speed of the car and the collision avoidance systems. Among the modern optoelectronic systems for cars, the systems of the radar type, comprising at least one transmitter and a receiving antenna incorporated inside a protective rigid casing, which is of small size and is wired to be connected to the central processing, control and display system, are widely used to this purpose. In particular, it was found that vehicle manufacturers integrate said optoelectronic safety systems in the front of the vehicle, in a protected position, and that to this purpose the most suitable position appears to be right behind said front grille in a central position, for example in correspondence of said distinctive badge or close to it. Moreover, it is known that such applications have specific technical and functional requirements, as well as aesthetic requirements; in particular, in the case of grilles and/or decorative plates and/or distinctive badges, it was found that the protective element placed in front of said radar also has to be transparent to electromagnetic waves at a specific frequency and also must have high aesthetic characteristics, being an integral part of the vehicle design and contributing to the appreciation and/or recognizability of the brand.

In more detail, the electromagnetic waves emitted by a radar system for vehicles aimed at the automatic setting of speed generally operate at a frequency of about 76 GHz; a protective element characterised by the transparency to said radar waves has a substantially uniform total thickness, without abrupt variations or ribs, made with materials that do not interfere with said waves, and wherein the surface towards the reading direction of said radar system, in a front direction of the vehicle, is of the convex type like a lens. It was thus noted that the greatest operating problems are caused by the metallized parts and by the raised and/or recessed parts, which sometimes cause deviations and/or interferences; particularly, the thickness variations pose the most relevant problems for the purpose of the correct transparency to the radar.

In general, plastic materials have characteristics that are among the most suitable for the invention, also being able to be combined in a multi-layer way with different levels of transparency and opacity and with different colours; in particular, the thermoplastic materials coupled in layers must have a dielectric constant similar to each other, not necessarily identical, because it is the right combination between the characteristics of the single materials, the thickness of each layer and the total thickness of the product that makes said plate correctly transparent to the radar waves, that is to say, proportionate to a specific wavelength.

Moreover, plastic materials have surfaces that can be coated by means of some industrial processes that allow to obtain a suitable aesthetic integration of the plate and also to guarantee minimum, or null, interferences to said electromagnetic waves. For example, in place of the conventional and unsuitable galvanic chromium plating, the decorated and overmoulded films like inserts, or also the metallized effect painting, or the Physical Vapour Deposition (PVD) of thin metals are widely used; it was thus found that, among them, in the case of pieces of limited size and for the purposes of the invention, said PVD coating is more appreciated because it provides a high aesthetic quality of the treated surface, at low costs and with low environmental impact.

In general, direct applications of said PVD vacuum coating on the external surface of metal or plastic components are known, and multi-layer applications are also known, which are called sandwich applications and in which one first applies by spraying a bottom layer, which is also called primer or base-coat, which is intended to improve adhesion and/or to compensate for the superficial defects of the rough substrate; then, over said metallization, there is an additional protective layer applied by spraying, which is also called top coat, which is transparent and smooth and is intended to block the thin PVD layer. By way of example only, see the sandwich solution called ePV™ by the company Oerlikon Surface Solutions AG, 9496 Balzers—Liechtenstein, www.oerlikon.com.

Mainly, PVD applications with adhesion promoting bottom layers and/or transparent protection layers are provided in the cases in which the plastic substrate is of a not very suitable material or in which high resistance metallization is required, for example as it occurs when the decorated component is exposed to the weather or is handled often. The operators of the sector also know that the qualitative requirements in the automotive sector are particularly high because long-terms tests and/or tests in aggressive environments such as salt spray tests, wear tests or rubbing tests must be passed.

Solutions are also known, which aim at improving and/or correcting the visual perception of said PVD metallization, in such a way as to get closer to a chromium plating effect or to provide special decorative effects, wherein at least said external protective layer, being visible, is pigmented. Furthermore, one considers as conventional the PVD second surface metallization solutions, that is to say, on the back surface of a transparent layer as, for example, a glass or polymeric sheet in such a way as to obtain the known mirror effect; in particular, one should remember the transparent plastic components that are second surface metallized and also backlit, in the cabins of the motor vehicles, to obtain the modern day chromium plating and night lighting effects. Furthermore, the conventional use of adhesion promoting layers intended to facilitate the adhesion of a second surface metallized layer, that is to say, on the back of a transparent and smooth layer, is known, which in any case modify the perception and/or the decorative effect thereof; moreover, effective solutions in which one single PVD deposition layer with ultra-thin thickness and applied on PMMA are not known.

Furthermore, it was found that among the transparent thermoplastic polymers less suitable to be coated by PVD treatments there are those with limited hardness; among them, in particular, there is polymethylmethacrylate, also known as PMMA; however, it is widely known that said polymethylmethacrylate is the best polymer for making transparent components of high aesthetic quality for optical uses, being generally used also in components for the automotive sector as an optimal choice, preferred with respect to said polycarbonate. In more detail, with reference to the above, an effective solution of second surface metallization for a component of transparent PMMA and opaque ABS is not known and available, wherein said PVD metallization is ultra-thin and also is firmly adherent to the smooth back surface, with no visible alteration caused by any interposed layers and with a good mirror-like aesthetic yield; said solution of back metallization being particularly resistant, cost-effective and easy to be produced.

In general, the operators of the sector have been looking for years for optimal solutions that allow to obtain the correct transparency to the waves emitted by a radar system through a complex protective and decorative element, that is to say, said plate or badge, using materials which are compatible with the wavelength of the radar and have homogenous dielectric characteristics. Particularly relevant for the purposes of functionality is the uniformity of the total thickness of said plate and/or the thickness variation between the single layers that form it, with steps or internal hollows not being tolerated; this characteristic, in fact, is difficult to be obtained in the multi-layer solutions with a lens comprising three-dimensional decorative elements, decorated in contrast, with a back support of completion of the type glued or joined by mechanical fixing, which is often imprecise in coupling and has hollow gaps altering the homogeneity of the section.

Furthermore, it was noted that the conventional solutions of back metallization of the distinctive elements, also with a dark contrasting background, are generally made by means of masking and painting, needing long and complex manual operations with much defectiveness and production wastes; on the other hand, the operators of the sector know that in the conventional back masking solutions, which are obtained by overmoulding, the closing of the mould between the different materials must be extremely precise in correspondence of the decorative elements, where even a small deformation or a misalignment upon closing can jeopardize the aesthetics of the piece, slow down productivity or alter the correct operation of said radar system.

Therefore, the operators of the sector have long been looking for solutions of improvement with respect to the known and conventional ones, to meet the modern requirements of motor vehicle manufacturers in such a way as to make available at low costs and with high production volumes a protective plate for radar systems, of the front grille distinctive badge type, which is easy to be produced and has a correct transparency to the electromagnetic waves as well as high aesthetic quality.

PRIOR ART

For the purpose of determining the prior art related to the proposed solution a conventional check was made, searching public archives, which has led to find some prior art documents, among which:
D1: EP3018505 (Cho Byung Kyu et al.)
D2: US20140218263 (Burdenski)
D3: US20150076851 (Sugiura)
D4: U.S. Pat. No. 6,328,358 (Berweiler)
D5: EP1812989 (Ehmann)
D6: JP2010274754 (Maruoka)
D7: U.S. Pat. No. 8,287,990 (Maeda et al.)
D8: ITTV20120152 (Bicego et al.)

D1 proposes a decorative coating solution for protective plates of radar systems, of the type with multi-layer thin metallization, wherein on the back of a transparent first PC layer there is provided a bottom layer, like a primer, obtained by a heat-hardening paint or ultraviolet ray paint that is pigmented to emphasize or to inhibit the aesthetic aspect of said metallization, which is made on the back with materials based on tin alloys in multiple layers different and alternated with respect to each other, and wherein one subsequently applies a heat protection layer in such a way as to overmould on the back a further closing layer of AES.

D2 describes a protection element for a radar system installed in the front part of a motor vehicle, which comprises at least two plastic plates, which are adhered to each other, being superimposed and of complementary shape, wherein the decorative treatment is interposed; in particular, the first plate is transparent and comprises a portion of internal surface, a concave portion covered with a PVD coating applied by means of an accurate removable masking, then painted at the back in such a way as to form between the two adhered plates a contrasting decorative element visible from outside.

D3 proposes a decorative plate for the exterior of motor vehicles having excellent productivity while enhancing weather resistance, being integrated in a front grille provided with a transparent window with, on the inside, a housing seat, wherein said plate is joined by means of a transparent adhesive layer. The plate in its turn is made up of a transparent front layer and a closing back layer, with, on the inside, recessed and protruding elements complementary to each other and included in the decorative layer formed by a colour layer that delimits them acting as a masking for the PVD metallization layer, being applied directly on the back of the transparent layer; the closing layer is formed in an integrated manner with an AES resin.

D4 describes a four-layer decorated plate, wherein the outermost layer is a lens of transparent plastic material, having the internal surface comprising hollow grooves that replicate in negative the shape of the chromed strips of the radiator grille on which it is housed; on the back a second, mask-like layer is applied, cutting out said hollow grooves, in such a way that the subsequent metallization treatment constituting a third layer highlights in contrast said hollow grooves obtaining the visual effect of thin three-dimensional metallic elements. A fourth layer, consisting of an opaque back support, having a supporting and protective function, and replicating said hollow grooves to obtain constant thickness, is then applied at the back.

D5 proposes a protective and decorative plate, which is transparent to radar waves being for the front grilles of motor vehicles provided with such an emission system, and which is made up of a visually transparent first layer, shaped on the internal side with the brand's distinctive elements hollowed out, like channels, in such a way as to appear in relief if observed from outside; at the back of and outside said hollows a second opaque plastic material with masking effect is overmoulded; then the interior of said hollows is decorated, for example by metallization, which is carried out with precision without overlapping the second material, the whole back of the component being subsequently filled with a third air-tight layer that also constitutes the fastening elements of the component. The materials of the two layers have the same dielectric constant and, once assembled, they form a decorated component having a substantially uniform section.

D6 describes a multi-layer decorative element with constant total thickness, of the distinctive badge type that is integrated in a front grille of a motor vehicle provided with a radar system, consisting of two main plastic layers obtained by moulding in two different phases between which there is a plurality of decorative treatments. In particular, the first layer is transparent and has a smooth front surface, like a lens, and the back surface is three-dimensionally shaped with recesses and protrusions that define the decorative elements and also simplify the colouring operations. Therefore, the background is obtained by colouring in contrast the back of said first layer by means of an ink jet technique, after covering the parts to be highlighted with rigid masking elements that are then removed in such a way that the following bright coating from the back, made by a PVD deposition technique, enhances the distinctive parts of the badge. After such decorative treatments the second layer is overmoulded, which is of support and not visible, and which completely covers the back surface of said first layer also obtaining protruding elements intended to be inserted in the corresponding holes present on the grille of the motor vehicle, for the purpose of fixing.

D7 proposes, on the other hand, a protective decorated plate for radar systems of motor vehicles that is of the monobloc type, with uniform total thickness or anyway compatible with said radar, being made up of three plastic layers overinjected with respect to each other and a decorative layer between the second and the third layer. The first layer is transparent like a lens and comprises on the back cavities intended to form decorative elements; the second layer is opaque and delimits exactly said cavities acting as an integrated contrasting mask, also with protrusions and undercuts on the back intended to be then integrated in the third closing layer. The rear surface of said first and second overinjected layer is therefore covered by PVD metallization, to be then closed by said third layer, that incorporates said protrusions and acts as a supporting and fixing base. Particularly, in a variant of the invention, two continuous and concentric retaining elements are provided, which protrude on the back of the first layer, of transparent polycarbonate, like small retaining walls intended to obtain a cavity between them to form a perimetric frame and also to facilitate the second moulding; such continuous elements have a triangular section with a thinned end, or point, having a nominal height slightly greater than the overall height of the second moulded piece from moulding, in such a way as to be elastically compressed during the moulding of the second layer, of coloured polycarbonate, preventing the material entering the cavity from drawing and/or deforming the profile of the decorative element.

D8, finally, describes a decorated plate transparent to radar waves for the front grille of a motor vehicle, of the monobloc plastic type with a reduced total thickness, made up of two overmoulded layers and a back decorative layer; the first external layer is transparent like a lens, of polymethylmethacrylate or of polycarbonate, and comprises decorative elements obtained in relief at the back in such a way that a second opaque layer, of a polycarbonate-acrylonitrile-butadiene styrene mixture, exactly compensates for the height thereof, that is to say, it is aligned with the heads of said decorative elements, simultaneously creating a masking contrasting background that also constitutes the support and comprises the snap-in fastening elements for the connection to the grille. Said decorative elements are coated at the back, on the transparent head surface, by means of a thin treatment with metallized effect obtained by means of a PVD or sputtering technology. Said plate is made by means of a multi-injection moulding process in such a way as to facilitate the closing of the mould, and also avoiding gluing and the conventional precision maskings aimed at the back decorative treatment.

Therefore, it is reasonable to consider as known a multi-layer protective plate structure of the type with contrasting decorative elements, such as a distinctive badge, to be applied on the radiator grille of a motor vehicle in such a way as to be transparent to the waves emitted by a radar system, consisting of:

a front layer of plastic material transparent to light, like a lens, with a smooth external surface and an internal surface comprising cavities or protrusions constituting the decorative elements to be highlighted with a metallization effect on the back;

a back layer of fixed covering of the areas outside said decorative elements, for example with black painting or masking overmoulding, or a removable masking of the type conventionally called stencil;

a decorative treatment with metallization effect made on the back of said layers, with various technologies and/or materials and/or thicknesses in such a way as to be not interfering with said radar system, for example by means of physical vapour deposition (PVD) of metallic vapours, transfer printing or paints;

decorative elements with metallized effect, made with various technologies and/or materials and/or thicknesses in such a way as to be not interfering with said radar system, for example by means of physical vapour deposition (PVD) of metallic vapours, transfer printing, paints or also overmoulding of thermoformed decorative films or inserts;

a supporting and fixing opaque back element that closes and replicates in adhesion the whole internal surface of the front lens and of the decorative elements forming a homogeneous and radar transparent structural sandwich, said element being of a thermoplastic material, glued or overmoulded in such a way as to form a homogeneous and radar transparent structural sandwich;

a monobloc plate obtained by multi-injection moulding of three layers, with a perimetric cavity of the frame type with a three-dimensional effect obtained between two thin retaining walls for the material molten during the second moulding phase, which have a triangular section and protrude from the back of the first transparent layer with a nominal height greater than the overall height of the second moulded piece from moulding in such a way as to be elastically compressed at the end, or point, when closing the mould on the second matrix;

a monobloc plate obtained by multi-injection moulding of two layers, wherein the decorative elements protrude rearward from the first layer in such a way that a second contrasting layer exactly compensates for the height thereof, considerably facilitating production and improving the quality of the product, and wherein on the back one applies a decorative treatment that is visible in transparency from outside through said decorative elements.

Drawbacks

All the proposed and known solutions have some drawbacks. In general, it is known that the phases of production of a radar transparent decorated plate, configured as a distinctive badge for a front grille, are numerous and of complex execution, since high quality and aesthetic levels are required; nowadays, moreover, high production volumes and increasingly low costs are requested for each badge model, consequently requiring a high degree of industrial automation. In fact, it was noted that the known solutions, as for example in D1-D7, can involve high industrial costs due to the multi-layer and/or multi-component configuration, which sometimes envisages a plurality of different operations with frequent handling; in particular, one should consider the separate moulding of the components, the coupling and/or gluing, the precision masking, the removal of layers and/or the multiple treatments. For example, D1 describes a multi-layer solution, which is expensive and not easy to be made, and which envisages the separate moulding of the layers and non-optimal materials for specific use, such as transparent polycarbonate, and also envisages on the back of the front layer a bottom layer that alters the aesthetic aspect of the back metallization; in particular, such a solution is not suitable for making with high productivity, resistance and aesthetic quality a modern distinctive badge for a front grille comprising contrasting decorative elements.

More generally, the problem of the long and expensive operations that are necessary for making removable maskings, with frequent defectiveness and production wastes, as for example in D2, D5 or D6, is known; in particular, one should think of the centering and/or alignment difficulty. Moreover, it should be noted that, in the case of said PVD technology, the induced vacuum needs a perfect adhesion of the masking element on the contours of the areas to be metallized. For these reasons, nowadays manual and/or removable maskings are not deemed to be suitable; likewise, in the case of large production volumes, tampography or any process of deposition of a masking layer with alignment difficulties are not recommended.

It is also known that the times and costs necessary for making and/or manually removing said maskings are avoidable by overmoulding directly on the transparent layer a fixed masking layer. In these cases, however, the second moulding phase has the problem of the closing of the mould in correspondence of the decorative elements, which must remain transparent and well delineated, this problem being particularly relevant in the case in which they are protruding and/or recessed; on them, in fact, the matrix of the mould must close with corresponding cavities and/or protrusions, as for example occurs in D5 or D7, the coupling being sometimes difficult due to different shrinkages and/or different moulding conditions. In particular, the problem of making a clear delimitation between the materials, in a repeatable way, is known. In the overmoulded solutions, said closing difficulty can cause a significant increase in production wastes and in costs, this problem being aggravated in the case of large production volumes wherein the frequent maintenance of the mould causes a gradual deterioration of the aesthetic quality of the finished piece. Moreover, the second surface PVD metallization treatment tends to highlight each defect present on the moulded piece.

Another problem was found in all the conventional solutions in which the thicknesses of the already decorated piece are compensated for with an additional back closing layer, or anyway with the input of material, for the purpose of ensuring said radar transparency and/or of protecting the decorative treatment at the back. Moreover, in the case in which the back closing layer is injection overmoulded, therefore at a very high temperature, on an already masked and decorated surface as for example in D5-D7, there is the problem of providing the back layer with sufficient resistance and continuity but also of not damaging the decorative treatment, thus protecting it with interposed layers or inserts; furthermore, in the case of layers that are moulded separately and glued, as for example in D1 or D2, sometimes there can be adhesion problems. All these disadvantages are more evident in the case of an extremely thin metallization.

In general, the operators of the sector know the serious problem of the weather resistance of the decorative treatments on the external components of motor vehicles, with particular reference to the thin metallizations like the depositions obtained by the PVD technology; for example, the degree of resistance to the conventional humidity chamber tests does not exceed 120 hours, while it is widespread practice to guarantee at least 240 hours. Generally, in these cases, it is envisaged to seal and/or pack in a waterproof way said decorative treatment, however, this solution being too expensive and also bulky and/or heavy; consider, for example only, the solution as in D2 or the headlights of motor vehicles with mirror metallization.

Therefore, it was noted that even the most evolved solutions do not ensure sufficient production quality and repeatability, wherein for example there is provided a metallized perimetric frame obtained between thin retaining walls of the molten material in the second moulding phase, which protrude with respect to the nominal height to guarantee sealing and be compressed during the moulding of said second material, as for example in D7. In particular, it was noted that said thin walls have a triangular cross-section with a thinned edge like a blade, which can deform in an evident way and lose the regularity of the contours, that is to say, highlighting every defect of the back decoration treatment. Therefore, such a solution increases the likelihood of production wastes and the frequency of maintenance of the equipment.

Finally, in the advantageous solution of a monobloc plate or badge with two overmoulded layers of equal height wherein a decorative treatment layer is directly applied on the back, as in D8, there is the problem that, if it is a directly applied thin metallization, said treatment is sometimes little effective and little resistant. In more detail, in relation to the solution proposed by this invention, the advantages of a modern ultra-thin PVD metallization treatment, that is to say, of less than 0.05 micrometres, are known, since it is of rapid deposition and cost-effective; however, it is not known how to apply it effectively on the back surface of said overmoulded layers, as in D8, when they are of transparent PMMA and opaque ABS-PC respectively, that is to say, of a material that is optimal for the specific function but unsuitable for the adhesion of the said coating in the automotive sector. In particular, where applied directly on the transparent material, it was found from the tests made that it is possible to obtain a good adhesion on PC but not on PMMA, colourless PMMA with maximum transparency being preferable, that is to say, of the type suitable for lenses or other optical uses, and also because it does not need the conventional front protective layer if used on the exterior of the motor vehicle, as instead occurs for PC.

Generally, it was also noted that the conventional solutions of layers interposed between a plastic support and a PVD metallization, like a primer or adhesion promoter, are not suitable for the invention; such layers, in fact, are generally used as a bottom, that is to say, under the metallization, in a non-visible position, and instead they hinder or anyway alter the perception of the metallic layer when they are applied in a reverse way, that is to say, on the back of a transparent material, as sometimes occurs in decorated and backlit badges. Moreover, suitable solutions intended to ensure a suitable adhesion to the PMMA and that also are perfectly colourless and transparent to light in such a way as not to alter said aesthetic perception, besides being resistant, cost-effective and applicable by spraying in an automated industrial plant, are not known.

Furthermore, it was noted that said solutions of ultra-thin PVD metallization are substantially semitransparent, that is to say, they have the need to close the back surface in adhesion in such a way as to block the passage of light and make the metallized effect perceivable to the human eye, from outside. To this purpose, some expensive solutions of complex execution are known; for example, a plastic element is provided that is moulded separately and then is coupled at the back of the treatment, like a bottom or support, or an integrated solution is known, in which, by means of specific equipment, said bottom is overmoulded on the back of said deposition in such a way as to cover it and also to make the total thickness of the piece uniform for the purpose of radar transparency. Therefore, all said above-described solutions are unsuitable for the invention.

To conclude, a decorated plate of the radar transparent distinctive badge type is not known and is nowadays desirable, which can be optimized in such a way as to meet the current requirements of motor vehicle manufacturers, in terms of resistance and quality, both technical and aesthetic, and being industrially producible in a facilitated way and with considerably reduced costs with respect to the currently available solutions. In particular, an advantageous plate or badge of the type with two overmoulded layers of equal total height is not known, wherein, in particular, the first layer is of a long-lasting material of high aesthetic quality, that is to say, for optical uses, with maximum transparency to light, compatible with a second opaque masking and supporting layer, and wherein on the back an ultra-thin PVD metallization treatment is provided, which is effective, resistant but cost-effective, and intended to guarantee high aesthetic quality and long duration also in an aggressive environment, such as a front grille of a motor vehicle. Furthermore, a variant of said plate or badge for radar system is desirable, with said decorative treatment, and that is provided with decorative elements that also have a three-dimensional appearance, visible like a protrusion facing the front side, that is to say, with a depth effect, likewise producible at a low cost in a simplified and repeatable way, respecting the restrictions of parallelism of the surfaces, of radar transparency and of absence of distortion necessary for the correct operation of the radar, with a lowering of the field by less than 2 db.

Considering all the above, there is the reasonable need for the companies of the sector to find some innovative solutions for overcoming at least the above-described drawbacks.

SUMMARY OF THE INVENTION

These and other aims are achieved by the present invention according to the characteristics as in the appended claims, solving the above-described problems by means of a radar transparent decorative plate (10), of the front grille (20) of a motor vehicle, of the monobloc type with a first layer (110) of PMMA transparent to light, like a smooth lens with decorative elements (111a, 111b, 111c) in relief on the back, and a second overmoulded layer (120) of opaque ABS-PC or opaque ABS that compensates for the height thereof simultaneously realizing a support with integrated fastening elements and a masking background.

The invention provides on the back a particular decorative treatment (130) comprising an ultra-thin metallization layer (132), having a thickness of less than 0.05 micrometres, on which a shadowing layer (133) with an anti-transparency effect is superimposed. Embodiment variants are provided, in which said decorative elements have a three-dimensional appearance obtained from a mould by means of cavities (111b, 117) in the head or with a shading optical effect (111c, 140).

Aims

In this way, by the considerable creative contribution the effect of which constitutes an immediate and important technical progress, various remarkable advantages are achieved.

A first aim was to realize a radar transparent decorated plate, such as a distinctive badge for the modern front grilles of motor vehicles, of the multi-layer and monobloc type with integrated fastening elements, which can be produced in a simplified and advantageous way with respect to the known solutions and with high aesthetic quality as well. In particular, an inexpensive, yet very effective and resistant, decorative treatment is obtained, of the multi-layer type to cover firmly the back surface of the two overmoulded layers forming the badge, which are made of a material that is optimal for the specific function but that is unsuitable for a PVD metallization coating being, respectively, of transparent PMMA for optical uses and of opaque ABS-PC; the decorative treatment provided by the invention allows to effectively apply on the back of said overmoulded layers an extremely thin metallization and also to guarantee its resistance in an aggressive environment like a front grille of a motor vehicle, for a long life.

A second aim was to realize a decorated plate or distinctive badge, as described above, wherein the decorative metallization treatment is of the PVD type with reduced thickness with respect to the conventional solutions, being of less than 0.05 micrometres, in such a way as to considerably reduce the costs and the production time relating to the said treatment, increasing productivity.

A third aim was to realize a decorated plate or distinctive badge, as described above, wherein said two main plastic layers are aligned and overmouldable in such a way as to provide a clear and constant delimitation in correspondence of the separation edge between said two materials, also after many mouldings.

A fourth aim, consequent to what has been set forth, consisted in reducing the times and costs for the production of the finished piece, reducing wastes, and also in reducing the maintenance of the equipment.

A fifth aim was to provide an improved configuration of a radar transparent plate and/or distinctive badge, which is thin, lightweight and extremely versatile, that is to say, adaptable to multiple designs.

An additional aim was to provide multiple embodiments of the advantageous radar transparent plate and/or distinctive badge, as provided by the invention, wherein the decorative elements also have a three-dimensional appearance easily obtainable by means of a mould, and without jeopardizing the optimal operation of the radar. In particular, there is provided a closing of the mould of the calibrated abutment type, that is to say, constant and repeatable, in such a way as to obtain in any case a clear delimitation between the two overmoulded materials, and thus such as to facilitate the overmoulding operations and reduce maintenance and/or wastes.

A further aim was to provide a configuration of a multi-layer plate and/or distinctive badge that is more resistant and less fragile with respect to a conventional product obtained by assembling single elements, eliminating the conventional coupling inaccuracy between the layers, without cavities or internal hollows.

These and other advantages will appear from the following detailed description of a preferred embodiment with the aid of the schematic drawings enclosed.

CONTENT OF THE DRAWINGS

FIG. 1 is a schematic vertical section of the decorative plate transparent to the emission waves of a radar system according to the present invention, being preferentially a distinctive badge intended to close the opening made in a front grille of a motor vehicle in correspondence of said radar system, anchoring itself to it; said plate being therein represented with a perimetric frame of aesthetic completion. The dashed circle refers to the enlarged detail as in the following figure.

Figure 6:
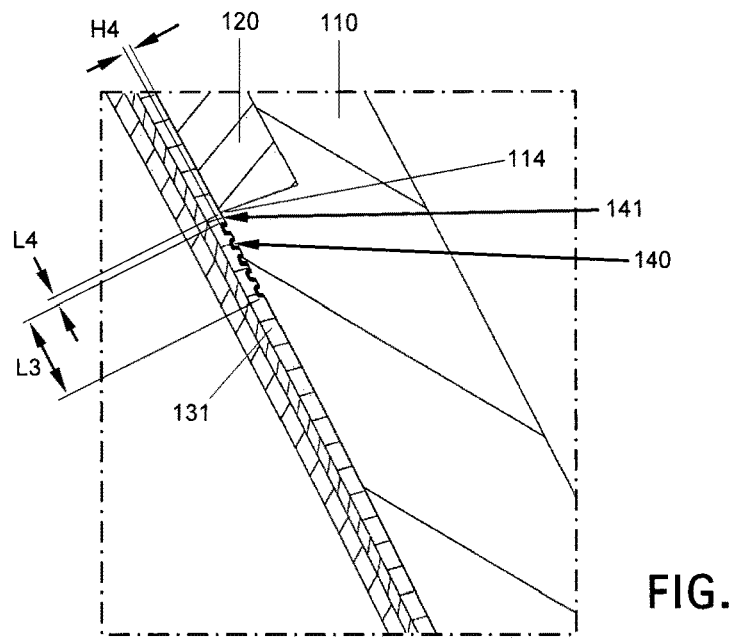
FIG. 6 is a further enlarged detail of the previous figure, in correspondence of said opaque band with microengravings, with reference to the area bounded by the dashed rectangle.
Figure 7A:
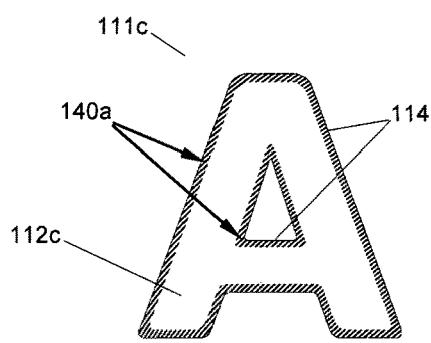
Figure 7B:
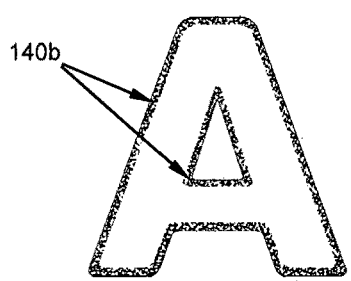
Figure 7C:
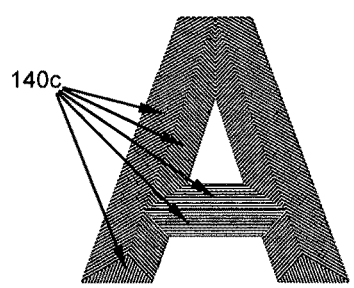

FIGS. 7a, 7b and 7c show frontally, schematically, exemplary embodiments of said opaque band with microengravings with a shading optical effect along the edges of a decorative element conventionally represented as a letter A, having respectively: a pattern of thin lines, inclined and parallel to each other (FIG. 7a) as in said FIG. 6, or of the irregular type (FIG. 7b), or of the complete extension type (140c) to simulate inclined walls with different reflection with respect to each other like a prism having a triangular section.

PRACTICAL REALIZATION OF THE INVENTION

The present invention proposes a decorated plate transparent to the emission waves of a radar system and intended to be frontally integrated in a modern front grille of a motor vehicle; with reference to the figures (FIG. 1-6) as well, a particular decorated plate (10) such as a distinctive badge is described, comprising decorative and/or distinctive elements of the brand, metallized as well, and intended to close an opening (201) that is made in said grille (20) in correspondence of said radar system (30), anchoring itself to it.

The invention provides a structure of a plate of the multi-layer and monobloc type, as in said document ITTV20120152 (Bicego et al.), however providing an optimized configuration in such a way as to be effectively adapted to the technical and aesthetic requirements of a modern distinctive badge for a radiator grille, with particular materials, solving the above-mentioned problems. The proposed solution particularly provides the moulding of the first layer (110) of polymethylmethacrylate for optical uses, that is to say, colourless and with maximum transparency to light, which is also known by the acronym PMMA, and then the moulding of the second layer (120) of an opaque Polycarbonate/Acrylonitrile-butadiene-styrene mixture, which is also known by the acronym PC/ABS, or of opaque ABS, realizing on the back of said overmoulded materials an advantageous decorative treatment (130) by ultra-thin PVD metallization, applicable in a rapid and inexpensive way, guaranteeing in any case high levels of adhesion and weather resistance and high aesthetic quality of the finished piece, which can be industrially produced at a low cost and with high repeatability. Furthermore, variants of the invention are provided, in which the decorative elements, which are integrated in the plate, have a three-dimensional appearance as is sometimes required in a distinctive badge of a brand, and such as not to jeopardize the optimal operation of said radar system.

It is clarified that, in the present description, by the term ultra-thin reference is made to an extremely thin thickness of the metallization layer, that is to say, smaller than the thin thicknesses generally provided for the decorative coating of the products of thermoplastic polymer, using the known PVD technology. In the known and conventional solutions, in fact, said coating is made by means of a progressive and prolonged deposition of metallic vapours, until reaching a solid consistency and an appearance clearly visible to the human eye; such a condition generally envisages a thin thickness that on average corresponds to a value between 0.5 and 20 micrometres, being mostly between 1 and 5 micrometres. In the present description, on the other hand, by the term ultra-thin one means a thickness of the metallic coating layer (132) that is of less than 0.05 micrometres, of poor material consistency and little evident to the sight if considered as such, being substantially of the semitransparent type.

In more detail (FIGS. 1, 2), a plate (10) is provided, which is obtained by multi-injection moulding of two main layers (110, 120) wherein a first layer (110) faces the front side (203) like an externally smooth lens, being colourless and transparent to light, and comprises decorative elements (111a) that are made at the back in relief like protrusions of said first layer (110) towards internal side (204). A second opaque layer (120) is overmoulded on the back of said first layer (110), and namely on the interface towards the internal side (204), limiting the thickness (H2) of said second layer (120) exactly to the height (H1) of said decorative elements (111a, 111b, 111c) in such a way as to be aligned to them leaving the head surface (112a, 112b, 112c) uncovered, and also obtaining fastening elements (121) integrated in said second layer (120). For the purposes of the invention and in order to obtain an optimal optical yield, with no front protective painting, it is envisaged that said first layer (110) is of colourless PMMA and transparent to light, while it is envisaged that the second layer (120) is of opaque ABS-PC or of opaque ABS, for example of a black colour, all these materials being optimal for their own specific function and also compatible with each other for the purpose of said multi-injection moulding. In the preferred embodiment (FIGS. 1, 2) said first layer (110) has a thickness between 1.8 mm and 3.2 mm, wherein the maximum value is referred to the height (H1) of said decorative elements (111a), while the second layer (120) has a thickness (H2) between 1 mm and 1.9 mm.

Figure 1:
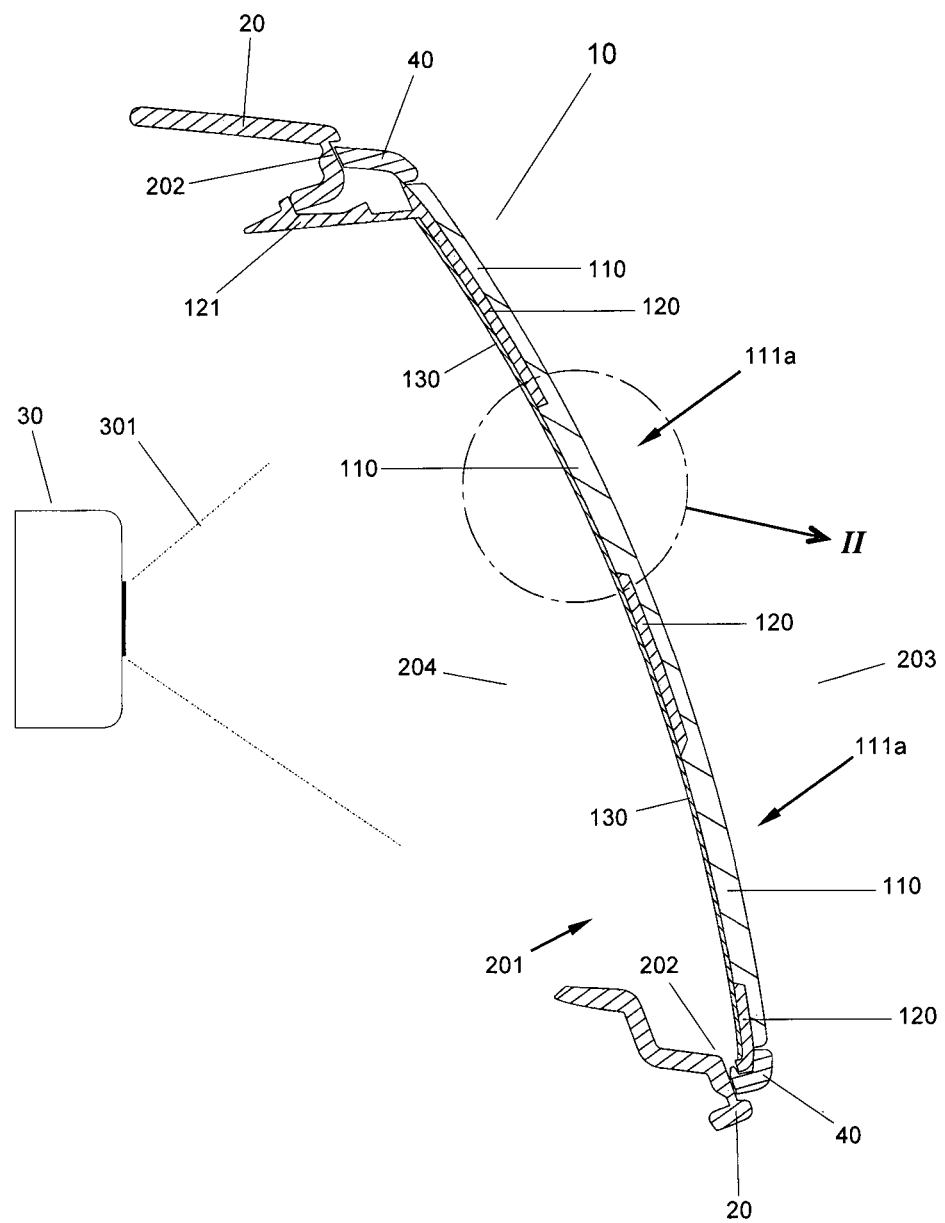

Said first layer (110) has a mainly aesthetic and optical function, it covers the whole external surface of the plate (10) like a lens having a substantially constant thickness except for said decorative elements (111a, 111b, 111c) protruding on the back, and with the whole front surface (115) having a large radius of curvature. Said second opaque layer (120) is of the multifunctional type: it creates a contrasting background that delimits and highlights said decorative elements (111a, 112a) (111b, 112b) (111c, 112c), intrinsically acting as a masking for said decorative treatment (130) and simultaneously realizing the supporting and fixing structure that allows to anchor and integrate said plate (10) in said front grille (20). Said anchoring of the plate (10) in the grille (20) occurs by means of said fastening elements (121) that protrude towards the internal side (204), being obtained by moulding in correspondence of the external edge of the plate (10) in such a way as not to jeopardize the correct transparency to the radar waves in its central part. By way of example, in a first embodiment configuration the head surface (112a) of said decorative elements (111a) is two-dimensional and smooth, that is to say, with the back surface (116) of the overmoulded layers (110, 120) that is substantially uniform and continuous (FIGS. 1, 2).

On the back surface (116) of said two overmoulded layers (110, 120), on the internal side (204), there is a decorative treatment (130) that covers at least said head surface (112a, 112b, 112c) of each decorative element; said treatment comprises a metallization obtained by means of a vacuum deposition technology, such as the Physical Vapour Deposition (PVD) technology. The decorative plate provided by the invention (10, 110, 120, 130) has a total thickness (H3) that is constant at least according to the area functional to said radar system (30). In particular, said plate (10) is conceived in such a way that said decorative treatment (130) is made up of the following layers superimposed in adhesion (131, 132, 133): an optional interface layer (131), an ultra-thin metallization layer (132) and a shadowing layer (133) (FIGS. 1, 2).

In more detail (FIG. 2), said metallization layer (132) is applied by said PVD technology in a thickness of less than 0.05 micrometres, being thus conventionally called ultra-thin. In order to optimize the adhesion of some metals or alloys to the above-mentioned plastic materials, where required, in front of said ultra-thin metallization layer (132) there is provided an optional interface layer (131), which is colourless and transparent to light and which is applied by spraying directly on the back surface (116) of said first and second overmoulded layers (110, 120), in such a way as to facilitate the following application of said metallization layer (132) in an extremely thin and uniform thickness. In such cases, it is envisaged to make said interface layer (131) with an anchoring and smoothing paint of the type called UV primer, with a polymeric matrix with a low content of solvents, with ultraviolet polymerization, that in particular is colourless and transparent to light in such a way as not to alter the visual perception of said ultra-thin metallization layer (132), it (131) being put in front and visible from the front side (203). Moreover, it is envisaged that said anchoring and smoothing paint, once applied and hardened, forms said interface layer (131) in a thickness between 5 micrometres and 20 micrometres, and with the surface facing the internal side (204) having an average value of superficial roughness of less than 0.08 micrometres, that is to say, Ra<0.08 µm according to the conventional European standards, in such a way as to make reflecting to sight the layers superimposed to it (132, 133) without altering the chromatic perception, with the finished piece considered from the front side (203).

Figure 2:
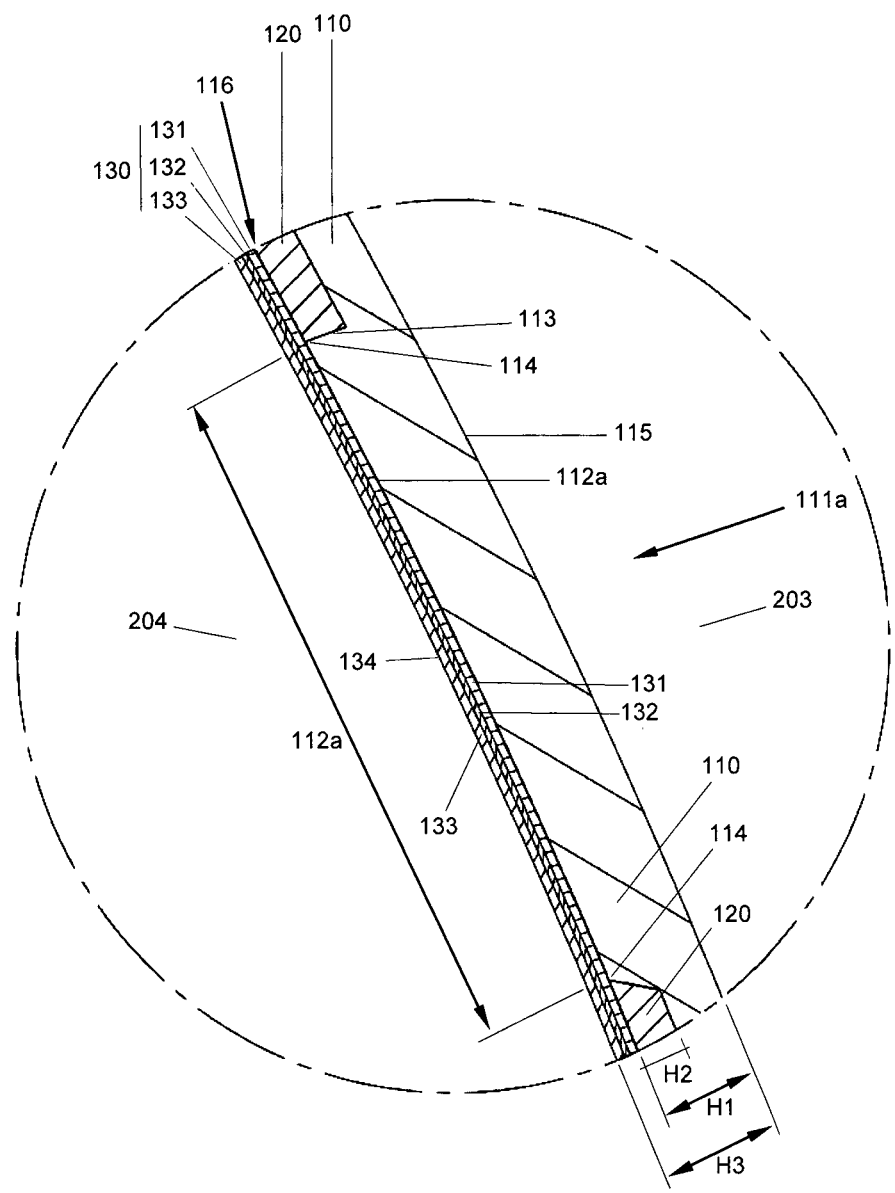
FIG. 2 is an enlarged detail of the previous figure, in correspondence of a decorative element, with reference to the area bounded by the dashed circle.
Figure 3:
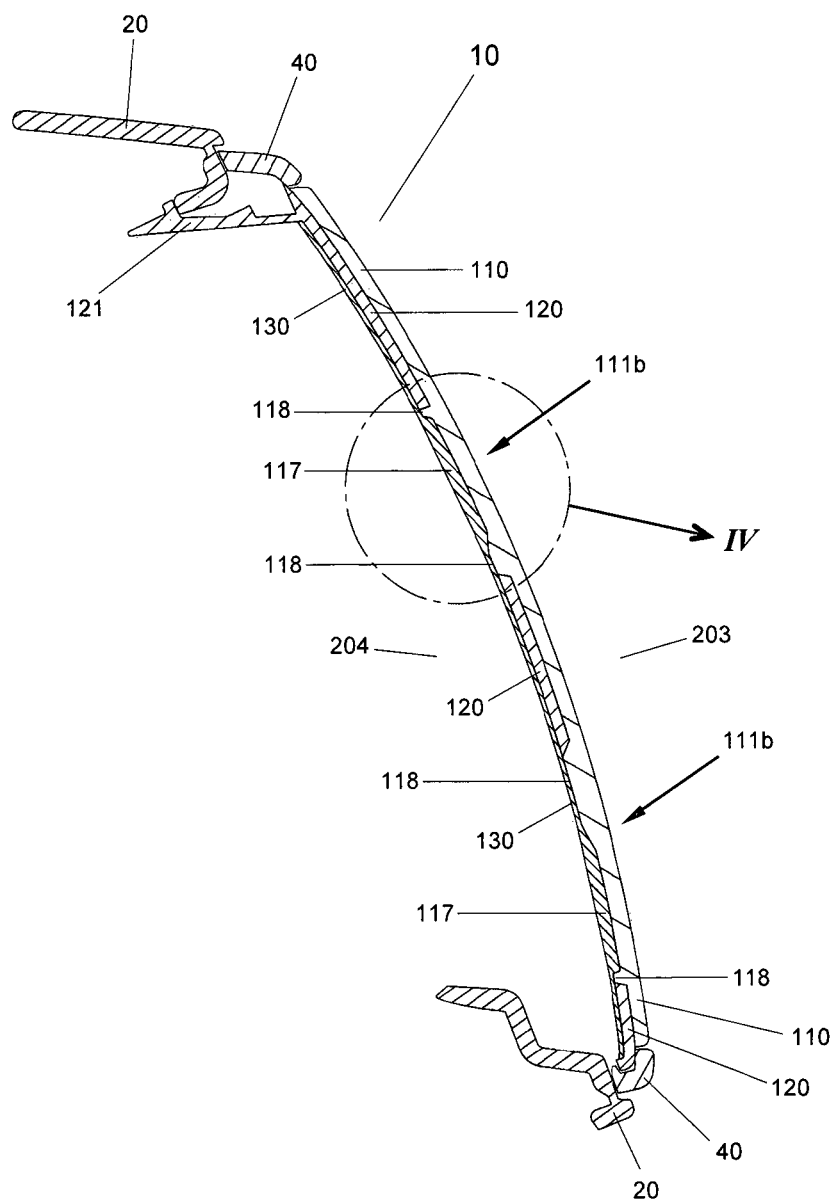
FIG. 3 is an illustrative schematic vertical section of an embodiment variant of the invention, wherein the decorative element of said plate or badge also comprises a cavity intended to provide a three-dimensional appearance. The dashed circle refers to the enlarged detail as in the following figure.
Figure 4:
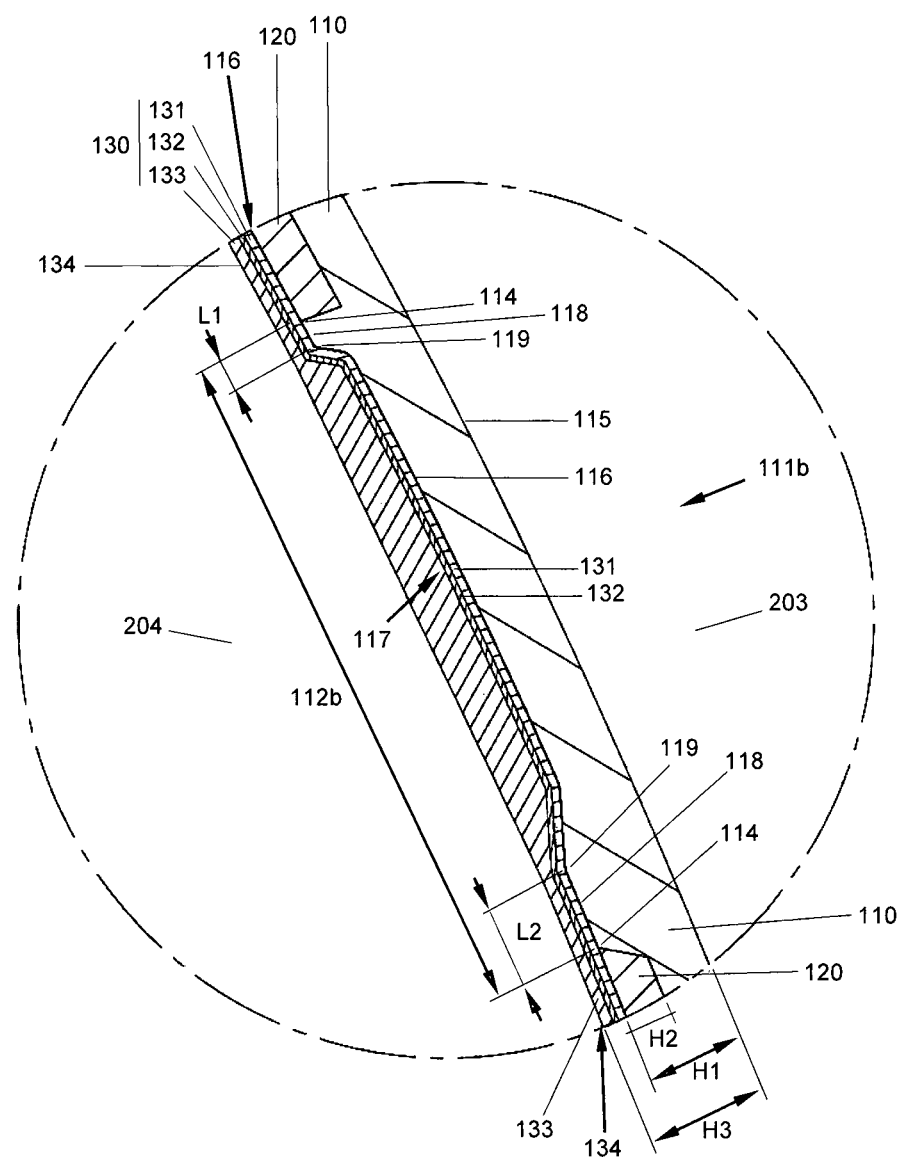
FIG. 4 is an enlarged detail of the previous figure, in correspondence of a decorative element, with reference to the area bounded by the dashed circle.
Figure 5:
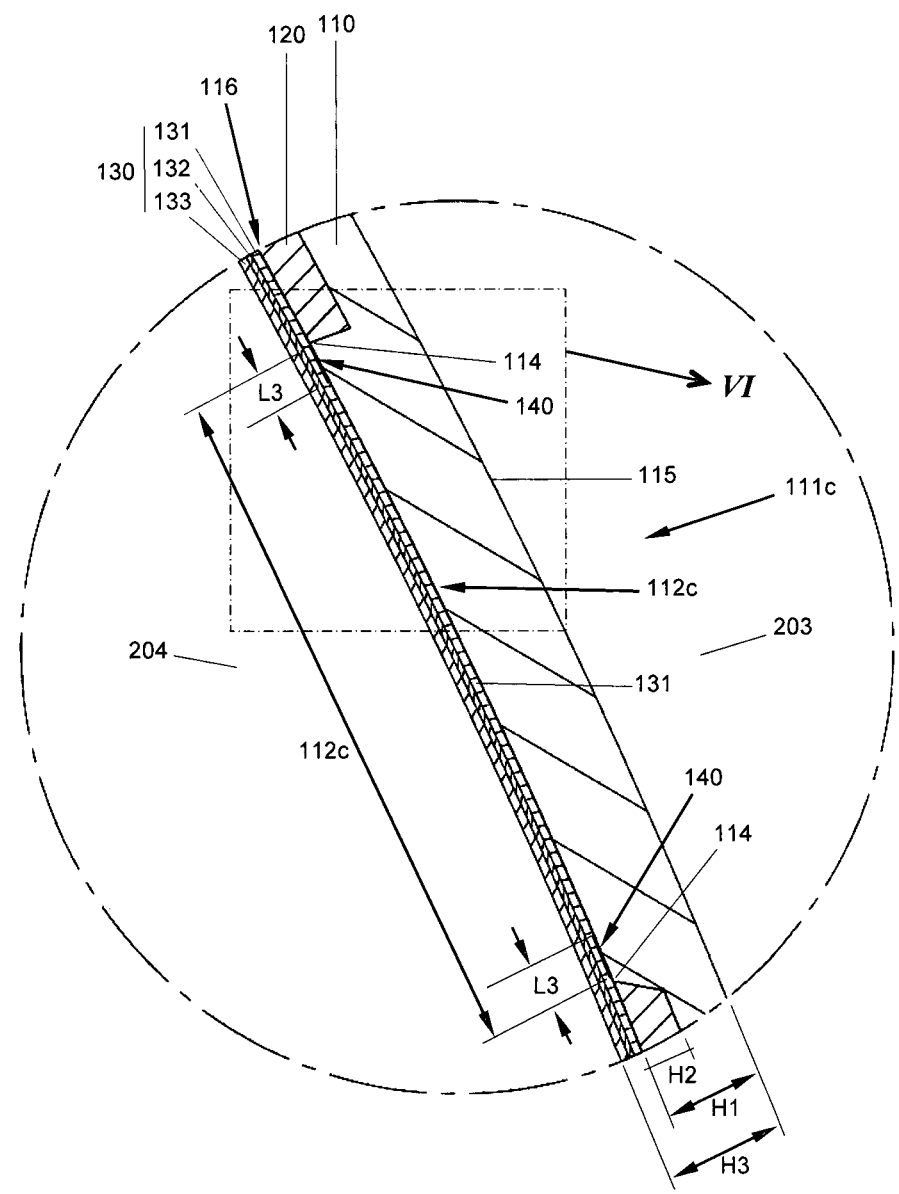
FIG. 5 is an embodiment variant of the invention, relating to the section in detail as in FIG. 2, wherein on the internal surface of the transparent first layer an opaque band with microengravings is obtained by moulding, which has a shading optical effect along the edges of the decorative element. The dashed rectangle refers to the further enlarged detail as in the following figure.

The last layer of said decorative treatment (130), facing the internal side (204), is a shadowing layer (133) with a protective and anti-transparency effect, being covering and opaque, applied in adhesion on the back of said ultra-thin metallization layer (132) in such a way as to make said metallization evident to sight when considered from the front side (203) (FIG. 2).

In an advantageous embodiment variant of the invention (FIGS. 3, 4), there are provided decorative elements (111b) that in the head surface (112b) comprise a cavity (117) intended to provide a three-dimensional appearance thereto, being visible from outside like a metallized protrusion facing the front side (203). At the sides of said cavity (117) and along the masking delimitation (114), that is to say, in correspondence of the separation between said first layer (110) and second layer (120), a portion (118) of said head surface (112) is maintained, which is aligned to the adjacent second layer (120), with superficial continuity. Said aligned portion (118) is arranged on the opposite sides of each cavity (117), that is to say, one on each side with respect to it (117), like a lateral retaining band having a constant height (H1) for a width (L1, L2) of at least 0.7 mm between said masking delimitation (114) and the delimitation of beginning of the cavity (117), being considered orthogonally with respect to said decorative element, that is to say, in cross-section, in such a way as to realize an effective and repeatable mould closing of the type with calibrated abutment on the first moulded piece from moulding.

In the preferred but not exclusive embodiment, said shadowing layer (133) is applied by spraying a material of the polyurethane paint type or, alternatively, by means of a printing technology such as pad printing, which is also known as tampography, of a material of the tampography ink type; such a solution is particularly suitable for decorative elements (111a) having a flat configuration, that is to say, with the front surface (115) and back surface (116) of said overmoulded layers (110, 120) that are substantially parallel or concentric with respect to each other (FIGS. 1, 2).

On the other hand, in said embodiment variant comprising said cavities (111b, 112b, 117) (FIGS. 3, 4), said shadowing layer (133) also acts as a thickness compensator in such a way as to keep said total thickness (H3) constant in any case, at least according to the area functional to said radar system (30); in that case, therefore, said layer (133) is preferably of a material of the polyurethanic technopolymer type applied by casting or, alternatively, by reaction moulding. It was further noted that, where there are small surface irregularities, depressions or small cavities, it is advantageous to provide said spraying technology, applying a greater thickness of paint.

In an alternative embodiment of the combined type, not shown in the figures, in correspondence of said cavities (117) there is provided a thin shadowing layer (133), applied in a conventional way, which is functionally integrated with an additional bottom layer that is injection moulded in a thermoplastic polymer and is joined to it at the back, or on the internal side (204); said bottom layer, being counter-shaped in such a way as to be coupled at the back with said cavities by means of corresponding protrusions, and such as to obtain a constant total thickness at least according to the area functional to said radar system.

Finally, in a further embodiment variant of the invention (FIGS. 5,6), there are provided decorative elements having a constant thickness (111c, H1) that, particularly, provide a superficial shading optical effect, in such a way as to simulate depth along the contrasting edge with the remaining shiny and metallized portion of the head (112c) of said elements (111c); said optical effect is visible from the front side (203) and is easily obtainable by moulding. In more detail, along the masking delimitation (114), that is to say, near the separation between the first (110) and the second layer (120), there is an opaque band with microengravings (140) which are directly obtained by moulding; to this purpose, the corresponding surface of the mould is laser engraved, recessed, in such a way as to appear in relief on the moulded piece (110) with a thickness (H4) between 20 micrometres and 50 micrometres (FIG. 6). Therefore, by the term microengravings, one means a plurality of thin lines and/or segments and/or points and/or drawings and/or backgrounds that form on the piece an opacifying pattern in relief with respect to the head (112c) of the decorative element, of high clearness and precision, being obtained by lasering on the mould, which does not reflect the light or reflects it partially and differentiated by areas.

For the purpose of an optimal closing of the mould of the second layer (120), said opaque band with microengravings (140) is preferably spaced apart from the edge of the decorative element (111c, 114) by means of a spacer band (141) without microengravings having a width (L4) of not less than 0.2 mm.

Said opaque band with microengravings (140) has a minimum width (L3) of at least 0.8 mm and a pattern functional to the desired optical effect, according to the provided point of view with the plate mounted; for example only, one can provide a pattern of thin, parallel and inclined lines (140a) (FIGS. 6, 7a), or an irregular pattern (140b) (FIG. 7b) or even a particular complete extension pattern wherein each opaque band (140c) has parallel lines that extend until meeting the opposite band having a different inclination and/or depth, in such a way as to simulate inclined walls with a different reflection with respect to each other like a triangular prism (FIG. 7c)

In particular it is noted that, in each embodiment configuration described above, both in the case of decorative elements with a two-dimensional appearance, that is to say, with a smooth head and constant thickness (111a, 112a) (FIGS. 1, 2), and in the case of three-dimensionally shaped decorative elements, that is to say, with said cavities in the head (111b, 112b, 117, 118) (FIGS. 3, 4), and in the case of decorative elements with a three-dimensional optical effect with said opaque bands with microengravings (111c, 112c, 140) (FIGS. 5, 6, 7a, 7b, 7c), the invention provides the same production logic comprising said two overmoulded (110, 120) and aligned plastic layers (114, H1, H2) like a masking, with the subsequent application on the back of the optional interface layer (131) of said ultra-thin metallization layer (132) and of said shadowing layer (133).

Finally, it was noted that a radar transparent decorative plate, shaped as a distinctive badge of the manufacturer and made as described above (FIGS. 1-6), is suitable to be coupled with a decorative element of completion, such as a perimetric frame (40), preferably metallized (FIGS. 1, 3). In a first case of coupling, the fastening elements (121) integrated in said second layer (120) of the plate (10) anchor themselves directly to the front grille (20), in the housing seat (202) around the opening (201), wherein said frame (40) is interposed and blocked between said plate (10) and said grille (20). In a second case of coupling, said fastening elements (121) anchor themselves to said frame (40) that, in its turn, anchors itself by its own fastening means to said front grille (20), in the housing seat (202) around the opening (201), said plate (10) being supported and blocked by said frame (40).

For example only, in a non-limiting embodiment of the invention, the above-described decorative plate (10) is industrially obtained by means of a production process comprising the following operating steps performed in sequence:

moulding of said front transparent layer (110) of PMMA with high transparency for optical uses, like an externally smooth lens that comprises at the back the decorative elements made in relief in such a way as to protrude towards the opposite side with respect to the front side, by means of the technology of multi-injection moulding of thermoplastic polymers; to this purpose, for example, the material commercially called Plexiglas® LED 8N LD96 by the German company Evonik Röhm GmbH—www.plexiglas-polymers.com is suitable for invention;

overmoulding of said opaque second layer (120) of ABS-PC, or ABS; to this purpose, for example, the material commercially called Bayblend® T45 by the German company Covestro AG-Bayer AG, www.plastics.covestro.com is suitable for the invention optional application of said interface layer (131) by spraying, in a thickness between 5 micrometres and 20 micrometres; a paint of the anchoring and smoothing type is suitable for the invention;

application of said metallization layer (132) by PVD technology, in a thickness of less than 0.05 micrometres;

application of said shadowing layer (133) wherein, in the case of a configuration with constant thickness (H2) of the decorative elements (111a, 111c) (FIGS. 1, 2, 5, 6), one applies by spraying a substantially uniform layer, for example a polyurethane paint; and wherein, on the other hand, in the case of a configuration with three-dimensional cavities (111b, 117) (FIGS. 3, 4), one applies by casting, in the related mould, a polyurethanic technopolymer.

The advantageous configuration of the invention allows, for possible production requirements, to invert the moulding order of the first and of the second plastic layer (110, 120), obtaining an equivalent result.

REFERENCE

(10) multi-layer and monobloc decorated plate, such as a distinctive badge for the front grille of a motor vehicle, transparent to the emission waves of a radar system;
(110) first moulded layer, of PMMA transparent to light;
(111a-c) decorative element obtained from the first layer, in relief towards the internal side like a protrusion, wherein the head corresponds to the portion not masked by the second layer and is metallized at the back, being visible from the front side. It can have a two-dimensional appearance with a smooth head and constant thickness (111a), or a three-dimensional appearance by means of cavities in the head (111b) or a superficial optical effect like shading (111c). In the present description by the term decorative element one means any distinctive and/or denominative element and/or element of aesthetic completion that is integrated in the plate and makes it recognizable, such as, as a non-exhaustive example, a company logo, a brand, a letter or number, a decorative frame or other metallized elements that are typical of the decorative plaques of motor vehicles; (112a-c) head of said decorative element that protrudes at the back from the first layer, respectively in said smooth two-dimensional configuration (112a), or three-dimensional configuration with cavities (112b) or with said shading optical effect (112c);
(113) side wall of the decorative element;
(114) masking delimitation, corresponding to the separation between the two moulded and aligned materials, that is to say, the contour of the decorative element;
(115) front surface, with a large radius of curvature;
(116) back surface of the overmoulded layers;
(117) cavity in the head of the decorative element, with a three-dimensional development, corresponding to a protrusion on the opposite side, that is to say, frontally visible like a relief;
(118) aligned portion of the head surface, like a band on the opposite sides of the cavity;
(119) delimitation of beginning of the cavity;
(120) second moulded layer, of opaque ABS-PC or opaque ABS;
(121) fastening element, integrated in the second moulded layer;
(130) back decorative treatment;
(131) optional interface layer, colourless and transparent to light;
(132) ultra-thin metallization layer, of the PVD type, having a thickness of less than 0.05 micrometres;
(133) shadowing layer, that makes the ultra-thin metallization evident;
(134) back surface of the decorative treatment, with the finished piece;
(140) opaque band with microengravings obtained from a mould by laser engraving, with a superficial optical effect like shading; for example, one provides a pattern with thin and inclined lines, parallel to each other (140a), or of the irregular type (140b), or of the complete extension type (140c) to simulate inclined walls.
(141) spacer band without microengravings;
(20) front grille of a motor vehicle;
(201) opening for the passage of radar waves;
(202) housing seat, integrated in the grille;
(203) front side, facing the exterior of the vehicle;
(204) internal side, that is to say, back side, facing the interior of the vehicle;
(30) device for the emission of radar waves, otherwise called radar system;
(301) radar waves;
(40) perimetric frame of completion with metallized finish, optionally interposed between the plate and the grille;
(L1, L2) width of the aligned portion of the head surface, on the opposite sides of the cavity;
(L3) width of the opaque band with microengravings;
(L4) width of the spacer band;
(H1) height of the first layer in correspondence of the decorative element, equal to the overall thickness of the two adjacent overmoulded layers;
(H2) thickness of the second layer, aligned to the decorative element in superficial continuity in such a way as to compensate for the height H1 thereof;
(H3) total thickness of the finished product, with the decorative treatment;
(H4) height of the reliefs, relating to the opaque band with microengravings, which corresponds to the depth of the laser engravings on the mould.

The invention claimed is:

1. Decorative plate transparent to the emission waves of a radar system of the front grille of a motor vehicle, such as a distinctive badge intended to close the opening that is made in said grille in correspondence of said radar system and anchoring itself to it, said decorative plate being of the monobloc and multi-layer type, obtained by multi-injection moulding of two main layers wherein a first layer faces the front side and is colourless and transparent to light, like an externally smooth lens comprising at the back decorative elements made in relief and protruding towards the internal side, and wherein a second layer is opaque and is overmoulded on said first layer, that is to say, on the interface facing the interior of the motor vehicle, limiting the thickness of said second layer exactly to the height of said decorative elements in such a way as to be aligned leaving the head surface uncovered, and also obtaining fastening elements integrated in said second layer; and wherein the first layer is of colourless PMMA transparent to light, while the second layer is of opaque ABS-PC or opaque ABS; and wherein on the back surface of the said two overmoulded layers, that is to say, on the internal side, there is a decorative treatment that covers at least said head surface of each decorative element and is a metallization obtained by a vacuum deposition technology, such as the technology called Physical Vapour Deposition (PVD); and wherein said plate has a total thickness that is constant at least according to the area functional to said radar system; and wherein said first layer has a mainly aesthetic and optical function, it covers the whole external surface of the plate and has a substantially constant thickness except for said decorative elements that protrude towards the internal side, with the whole front surface that has a large radius of curvature; and wherein said opaque second layer is of the multifunctional type, in such a way as to realize the contrasting background that delimits and highlights said decorative elements, intrinsically acting as a masking for said decorative treatment and simultaneously realizing the supporting and fixing structure that allows to anchor and integrate said plate in said front grille; and wherein said anchoring of the plate in the grille occurs by means of said fastening elements that protrude towards the internal side, being obtained by moulding near the external edge of the plate in such a way as not to jeopardize the correct transparency to radar waves in its central part; and wherein said decorative plate is characterised in that said decorative treatment comprises the following layers superimposed in adhesion: an ultra-thin metallization layer and a shadowing layer of the covering and opaque type with an anti-transparency effect, wherein said ultra-thin metallization layer is applied by said PVD technology in a thickness of less than 0.05 micrometres, and wherein said shadowing layer is applied on the back of said ultra-thin metallization layer, that is to say, on the internal side, in such a way as to protect said ultra-thin metallization and simultaneously make it evident to sight, if considered from the front side.

2. Decorative plate according to claim 1, characterised in that said decorative treatment also comprises an interface layer, which is colourless and transparent to light, and which is applied by spraying directly on the back surface of said first and second overmoulded layers, that is to say, in front of the ultra-thin metallization layer, in such a way as to facilitate its application; said interface layer, comprising an anchoring and smoothing layer, of the UV primer type with polymeric matrix, with a low content of solvents, with ultraviolet polymerization, that, once applied and hardened, forms a thickness between 5 micrometres and 20 micrometres, and with the surface facing the internal side that has an average value of surface roughness of less than 0.08 micrometres, that is to say, Ra <0.08 pm, in such a way as to make the layers superimposed to it, reflecting to sight and not to alter the chromatic perception thereof, said interface layer being put in front considering said decorative plate from the front side.

3. Decorative plate according to claim 1, characterised in that said shadowing layer is applied by spraying of a material of the polyurethane paint type.

4. Decorative plate according to claim 1, characterised in that said shadowing layer is applied by tampography of a material of the tampography ink type.

5. Decorative plate according to claim 1, characterised in that at least one decorative element comprises in the head surface a cavity that provides to it a three-dimensional appearance, it being visible like a metallized protrusion facing the front side.

6. Decorative plate according to claim 5, the characterised in that in said decorative element, on the sides of said cavity and along the masking delimitations, that is to say, in correspondence of the separation between said first layer and said second layer, a portion of said head surface is maintained, which is aligned to the adjacent second layer, in superficial continuity; and wherein said aligned portion is on the opposite sides of each cavity, that is to say, one on each side with respect to it, like a lateral retaining band having a constant height for a width of at least 0.7 mm between said masking delimitation and the delimitation of beginning of the cavity, said width being considered orthogonally with respect to said decorative element, that is to say, in cross-section, in such a way as to realize an effective and repeatable mould closing of the type with calibrated abutment on the first moulded piece from moulding.

7. Decorative plate according to claim 5, characterised in that said shadowing layer is also a thickness compensator, in such a way as to keep said total thickness constant in any case, at least according to the area functional to said radar system, being of a material of the polyurethanic technopolymer type applied by casting or, alternatively, by reaction moulding.

8. Decorative plate according to claim 5, characterised in that said shadowing layer has a thin and uniform thickness and is functionally integrated in an additional bottom layer that is injection moulded separately, in a thermoplastic polymer, and is joined to it at the back, that is to say, on the internal side, being counter-shaped in such a way as to couple at the back with said cavities by means of corresponding protrusions and to obtain a constant total thickness at least according to the area functional to said radar system.

9. Decorative plate according to claim 1, characterised in that it comprises decorative elements having a constant thickness which have on the head surface, along the masking delimitation, that is say, near the separation between the first layer and the second layer, an opaque band with microengravings obtained directly by moulding, the corresponding surface of the mould being laser engraved, recessed, in such a way as to be in relief on the moulded piece and provide said head surface with a shading optical effect, visible from the front side, said opaque band with microengravings having a thickness between 20 micrometres and 50 micrometres; and wherein said opaque band with microengravings has a width of at least 0.8 mm and is parallel to said masking delimitation, being spaced apart from it by means of a spacer band without microengravings; said spacer band having a width of at least 0.2 mm.

10. Decorative plate according to claim 9, characterised in that said opaque band with microengravings has a pattern that is, alternatively: of the type with thin, inclined and parallel lines, or of the irregular type, or of the complete extension type wherein said thin lines of a band extend until meeting the opposite opaque band, having a different inclination and/or depth, in such a way as to simulate inclined walls with a different reflection with respect to each other like a triangular prism.

11. Decorative plate according to claim 1, characterised in that it is associated in an integral way with a decorative element of completion, of the metallized perimetric frame type.

12. Decorative plate O-according to claim 11, characterised in that said fastening elements anchor themselves directly to said front grille, in the housing seat around the opening, wherein said frame is interposed and blocked between said plate and said grille.

13. Decorative plate according to claim 11, characterised in that said fastening elements anchor themselves to said frame that, in its turn, anchors itself by its own fastening means to said front grille, in the housing seat around the opening, said plate being supported and blocked by said frame.

* * * * *